Figure 1:
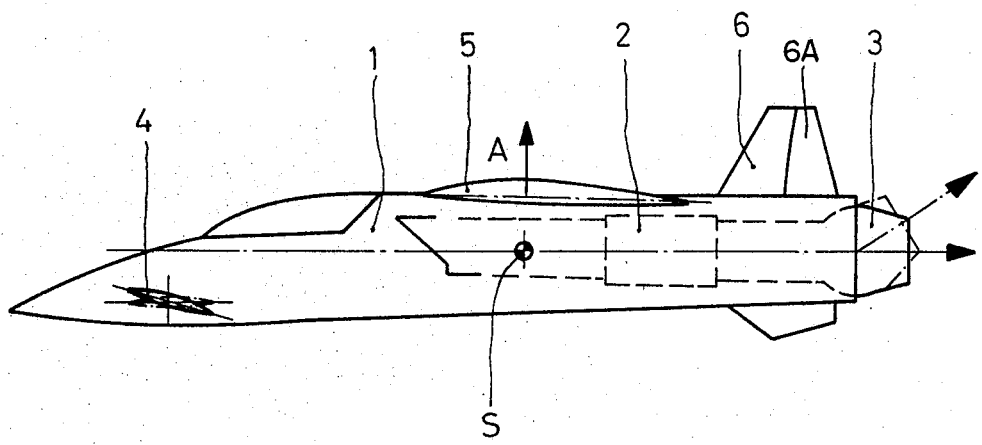

United States Patent [19]
Croy et al.

[11] 3,884,435
[45] May 20, 1975

[54] METHOD FOR THE CONTROL OF A JET AIRCRAFT AND APPARATUS FOR PERFORMING THE METHOD

[75] Inventors: William J. Croy, Vaterstetten; Andreas Mederer, Marktschwaben, both of Germany

[73] Assignee: Messenschmitt-Bolkow-Blohm GmbH, Munich, Germany

[22] Filed: Feb. 15, 1973

[21] Appl. No.: 332,698

Related U.S. Application Data
[63] Continuation of Ser. No. 88,737, Nov. 12, 1970.

[30] Foreign Application Priority Data
Dec. 22, 1969 Germany............................ 1964205

[52] U.S. Cl. ..................... 244/76 J; 244/46; 244/52
[51] Int. Cl. ......................... B64c 3/38; B64c 15/02
[58] Field of Search...... 244/76 R, 76 J, 75 R, 77 F, 244/52, 45 A, 46, 12 A

[56] References Cited
UNITED STATES PATENTS

| 1,916,813 | 7/1933 | Sessa.................................. 244/46 X |
| 2,765,993 | 10/1966 | Custer................................. 244/52 |
| 3,069,117 | 12/1962 | Reid................................... 244/75 |
| 3,438,581 | 4/1969 | Smith................................. 244/52 X |
| 3,515,361 | 6/1970 | Blackburn....................... 244/76 R X |

FOREIGN PATENTS OR APPLICATIONS
874,845 8/1961 United Kingdom............... 244/76 R
1,191,941 5/1970 United Kingdom................... 244/46

Primary Examiner—Duane A. Reger
Assistant Examiner—Barry L. Kelmachter
Attorney, Agent, or Firm—Woodhams, Blanchard and Flynn

[57] ABSTRACT

Method and apparatus for attitude control of jet aircraft. In the method, a jet deflection device responds to a variation from the desired attitude in the direction to correct same. Such control is followed by a change in aerodynamic trim control device for effecting correction in the same direction as that effected by the jet deflection and a return of the jet deflection to its initial position. Preferably, the aerodynamic control follows the jet control by a sufficient period of time to minimize its tendency to respond to temporary disturbances such as wind gusts or control inaccuracies. The apparatus aspects of the invention comprise aerodynamic control surfaces which may be canards at the forward end of the fuselage or a sliding wing, together with control and time delay circuitry for adjusting the position of same in response to a variation between actual attitude and desired attitude and preferably including time delay circuitry for effecting the aerodynamic trim correction control a determinable period of time following the jet deflection control.

5 Claims, 6 Drawing Figures

METHOD FOR THE CONTROL OF A JET AIRCRAFT AND APPARATUS FOR PERFORMING THE METHOD

This is a continuation of application Ser. No. 88737, filed Nov. 12, 1970.

The invention relates to a method for the control of a jet aircraft with an adjustable thrust deflection device controlled by an attitude stabilizer to produce the control moments and to apparatus for performing the method. The attitude stabilizers mentioned hereinafter are intended to mean in each case the stabilization systems for the aerodynamic attitude.

The principal purpose of replacing the customary tail control surfaces used heretofore by devices for deflection of the jet is to reduce, or completely eliminate, the high aerodynamic resistance caused by the tail section control surfaces which are always designed for low speed flight conditions. In addition, there are other advantages, namely, that the control moments produced by thrust deflection devices of this kind are not dependent upon ram pressure and therefore, especially during slow speed flight, they can be considerably greater than those produced by aerodynamic tail section surfaces so that it is possible to attain more effective control during landing and takeoff. Methods such as those mentioned above have already been disclosed in accordance with which the pitch and yaw control moments are produced entirely by deflection of the jet through the use of rotating nozzles. However, aircraft controlled by such means usually have no inherent stability whatsoever so that flying, for example, without a hand on the stick and without an electronic attitude stabilizer is not possible. Also, the control moments attainable at high angles of attack and high flight speeds are insufficient, owing to the drastic shift in the aerodynamic center.

A method such as the one mentioned above in conjunction with a so-called $\alpha$-control ($\alpha$= angle of attack) has also been proposed. In this method, the rotating nozzles are controlled by a control device that lends the aircraft the necessary stability. However, this could possibly increase the size and/or complexity of the airborne electronic equipment.

A drawback of pure reaction control is, for example, that the moments occuring when high lift devices are used of those occurring during flight involving high stationary g-loadings must be continuously compensated by means of the deflected jet discharge. This results on the one hand in reduced authority in the control device, since the continuous deflection angle is lost in a possible needed control deflection in the same direction. On the other hand, when the high lift devices create a nose-heavy moment, in order to compensate this by conventional tail section control surfaces, a downwardly-directed thrust moment is needed, thus nullifying the effect of the high lift devices.

It is, therefore, the object of the present invention to provide a method such as the one mentioned above and a device for the realization of this method having the high effectiveness of reaction control in slow speed flight, combined with the advantageous stabilizing and damping qualities of aerodynamic control, but without the mentioned drawbacks of both types of control.

The invention accomplishes this objective as follows: when the aircraft varies from the desired attitude, the position of the thrust deflection device is first adjusted by means of the attitude stabilizer in proportion to the variation (proportional control section) and aerodynamic trim control means are actuated in the same sense at a velocity proportional to the variation (integral or time delay control section). As the control moment produced by the aerodynamic control means increases, the deflection devices are brought back to their zero position. For example, if an exterior disturbance causes a variation from the desired attitude, first of all, the jet deflection devices are actuated proportionately to the attitude variation to compensate the moment in order to bring the aircraft back into its desired attitude. The aerodynamic control means are moved in the same sense and at a velocity proportional to the variation, following which, the jet thrust devices are controlled back by the amount existing at the time the control moment is taken over by the aerodynamic control means. The control operation is thus, as a rule, completed by the aerodynamic control means. The thrust deflection devices have, in the meantime, reached their zero position so that their complete authority is available for a further control action. After the control operation is completed, the aerodynamic control means are also brought back into their neutral position in a known way.

The variation from the desired position is formed in the attitude stabilizer by comparison of the actual attitude of the aircraft with the desired attitude. It is inconsequential whether the actual attitude varies from an established desired attitude (exterior disturbance) or whether the desired attitude is changed with respect to an existing actual attitude (pilot command or command from an automatic pilot). The control operation is in both cases carried out in principle in the same way.

If the aircraft is equipped with high lift devices, nose-heavy moments usually result when such devices are actuated. These moments are initially compensated by a deflection of the jet so that no pronounced attitude change can occur. Completion of the control operation is then assumed by the aerodynamic trim control means in the described manner, whereupon the jet deflection devices center themselves in the zero position. This has great advantage, above all in the takeoff phase since, in the case of pure reaction control, a thrust component which would otherwise contribute to forward propulsion is lost, even though a minor one.

In addition to the described separation into a pure proportional and a pure integral or time delay control section, it is also possible, for example, to provide the aerodynamic control means with a mixed proportional and integral or time delay control response. For the sake of clarity and lucidity, such an arrangement will not be treated in detail.

Another feature of the invention provides that the time delay between complete rotation of the jet deflection device and complete effectiveness of the aerodynamic trim control means be greater than the duration of typical unsteady disturbances (gusts, control inaccuracies). These unsteady disturbances are therefore normally compensated solely by jet deflection while steady moments, such as arise due to use of high lift devices, due to various load conditions and due to protracted control deflections of the pilot are essentially compensated by the aerodynamic trim control means. The aerodynamic controls also assure aircraft controllability with an idling or failed engine, i.e., when the jet deflection devices produce no control moments, or none of any conseqence.

In order to realize the method, the invention provides for a device which contains controllable thrust deflection devices, aerodynamic control means to control the aircraft about its axes and an attitude control system, controlled by the pilot and by the desired attitude probes, for control of the deflection devices and the aerodynamic control means.

The invention provides a device, especially for pitch control, in which the jet deflection devices are represented by known jet nozzles located on the aft fuselage section and capable of rotation in the longitudinal plane of symmetry and in which the aerodynamic control means are in the form of canard wings on the fuselage forward section, forward of the aircraft center of gravity. The canard wings arranged forward of the aircraft c.g. also have the known advantage that all nose-heavy pitch moments can be compensated by a component acting upwards, i.e., in the direction of lift so that, especially when high lift devices are used, their effect is not reduced.

Another illustrative embodiment of the invention provides that, in addition to the previously described, rotating jet nozzles on the aircraft aft fuselage section, wings that slide in a fore and aft direction be used. With a device of this kind, all tasks performed by the control surfaces located forward or aft of the center of gravity of the aircraft can be fulfilled in the known way, without, however, having to tolerate additional drag.

In the case just described, the wing is built as a continuous part which slides on rails located in the fuselage.

In accordance with another feature of the invention, the jet deflection devices and the aerodynamic control means are operated by hydraulic actuators.

Other illustrative embodiments of the invention are shown in the drawing and will be more closely described hereinafter. Shown are:

FIG. 1—Side-view of an aircraft with rotating nozzles located in the aft fuselage section and canards forward of the center of gravity.

Figure 2:
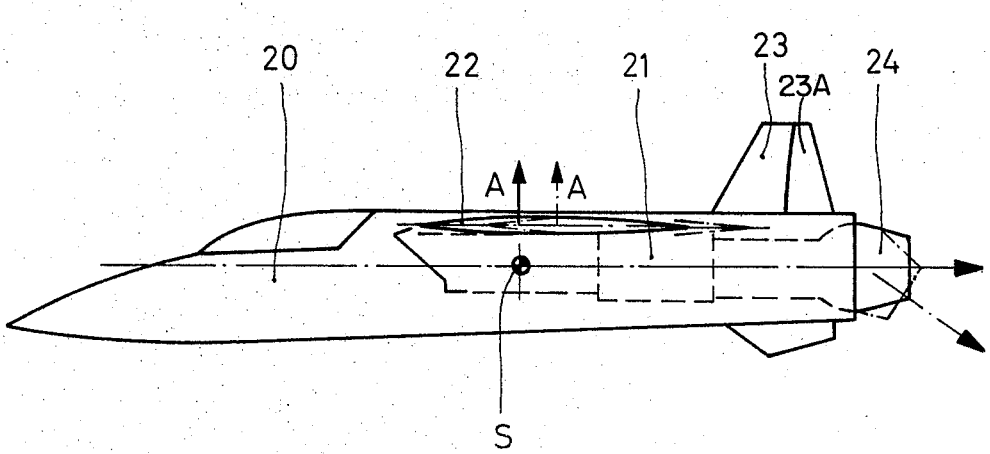

FIG. 2—Side-view of an aircraft with rotating nozzles in the aft fuselage section and a wing that slides parallel to the aircraft longitudinal axis.

Figure 3:
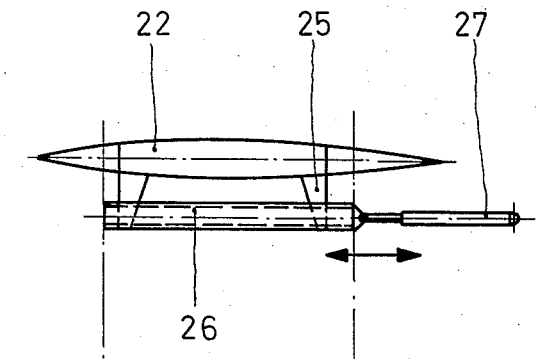
Figure 4:
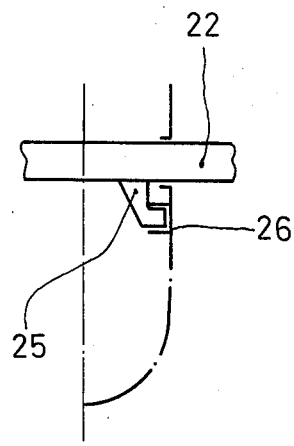
Figure 5:
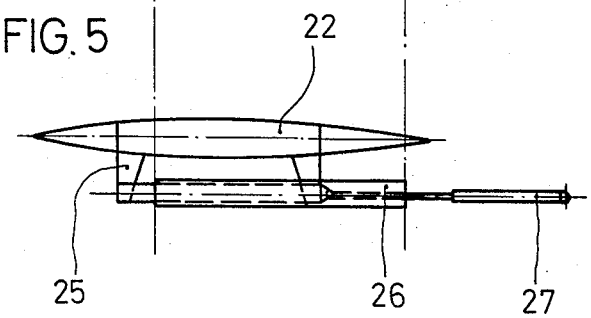

FIGS 3-5—An example of a slide mechanism for a wing according to FIG. 2 in various views and positions.

Figure 6:
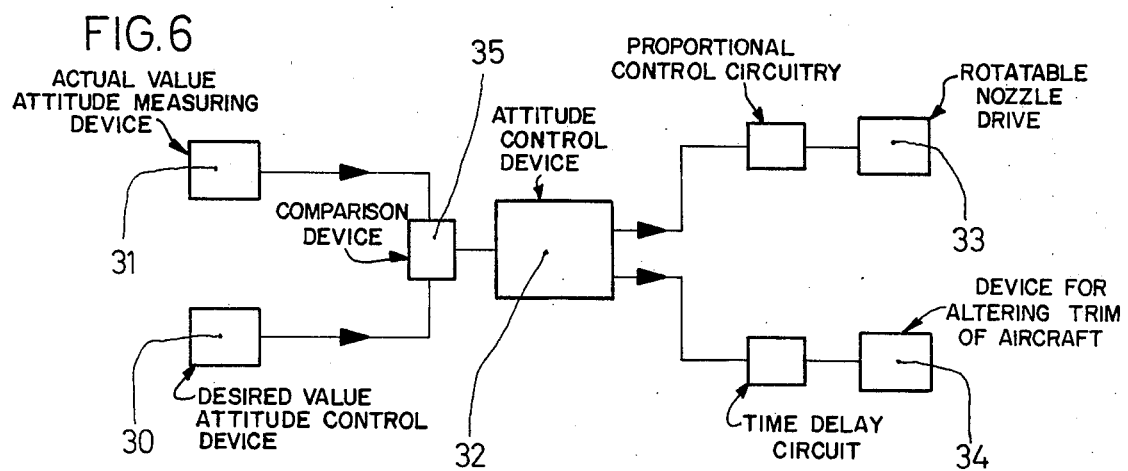

FIG. 6—A block diagram for the control loop for control of the jet deflection devices and the aerodynamic control means.

The aircraft shown in FIG. 1 has either one engine or two engines 2 located side by side, the exhaust nozzles 3 of which are capable of rotation in the aircraft's vertical plane of symmetry. (See U.S. Pat. Nos. 3,260,049 or 3,327,480. ) Located on the forward fuselage section is a pair of canard control surfaces 4 whose angle of attack is adjustable. Aileron control is accomplished in the known way by ailerons located on the wing 5 and directional control, likewise in the known way by a controlled vertical tail surface 6A on the vertical tail 6. The configuration presented in FIG. 1 shows the rotating nozzle 3 in the normal position and at maximum upwards deflection (broken lines), for example, to correct a nose-heavy disturbance. The canard, although deflected only slightly, is acting in the same direction. If the disturbance is of longer duration, the canard is moved by the flight stabilization device installed in the aircraft at a velocity proportional to the attitude variation to the point where it can correct the disturbance, while the rotating nozzle is centered again in its zero position.

FIG. 2 shows an aircraft 20 with either one engine or two engines 21 side by side, wing 22, which in turn has the usual ailerons, a closer description of which is omitted, controlled vertical tail surface 23A on a vertical tail 23 and jet nozzles 24 which can be rotated in a vertical plane. The position of wing 22 shown with solid lines corresponds to the normal flight attitude in which the line of action of the lift A passes through the center of gravity S. In the case of a tail-heavy disturbance, i.e., one which causes pitch-up, the rotating nozzle is deflected into the position shown with dot-and-dash lines, a position proportional to the attitude variation of the aircraft, in order to counteract the disturbance. If the disturbance is of greater duration and lasts longer than the delay between the integral control section (aerodynamic trim control means) and the proportional control section (jet deflector), then the aerodynamic control means, in this case the sliding wing 22, accomplishes correction of the disturbance, in that it is caused to slide aft so that it assumes, for example, the position shown with dot-and-dash lines. When the wing slides aft, the rotating nozzle 24 returns again to its neutral position.

As is the case with the desired position attitude probes which register disturbances, the pilot's command signals act initially upon the rotating nozzle through the airplane's flight control system and with a time delay upon the aerodynamic trim control means. Of course, in place of attitude probes, accelerometers or angular velocity transducers can be provided. The example of the control principle shown for pitch control could possibly be applied to yaw control.

In principle, the wing moves such that the center of lift, in the case of an anticipated change from a stable flight attitude (due to a pilot command) is moved away from the c.g. On the other hand, when a disturbance in which the line of action of lift does not run through the center of gravity is compensated, this line is moved towards the center of gravity.

FIGS. 3-5 show in sketch form the wing 22 per FIG. 2 which is supported on rails 26 in the fuselage of aircraft 20 by means of supports 25. Drive is provided by an hydraulic actuator 27 which receives commands from the attitude stabilization system.

FIG. 6 shows the block diagram of a control device for the described method. The control value transducer 30 which provides the desired attitude and the actual attitude transducer 31 both furnish signals through a comparison circuit 35 to the attitude control system 32 which compares these signals with the desired attitude and determines the needed control moment. Resulting from this value are the signal for the rotating nozzle drive 33 (proportional control section which comprises a time delay circuit), and the signal for the aerodynamic trim control means 34 (integral control section which comprises a time delay circuit). (See U.S. Pat. Nos. 3,515,361. When control is assumed by the aerodynamic means, the positions of the rotating nozzles are continuously compared with the aerodynamic trim control means by means of feedbacks to the attitude control system 32, so that the overall moment needed to correct the disturbance or to accomplish the control command is not exceeded.

The embodiment of the invention in which an exclusive property or privilege is claimed are defined as follows:

1. A method for maintaining a stabilized flight of an aircraft having propulsion means for propelling a gaseous jet rearwardly of said aircraft for propulsion of said aircraft, a wing with ailerons for aerodynamic support and a vertical tail surface, said aircraft being free of a horizontal tail surface, the steps comprising:

selectively controlling a movable nozzle adjacent the aft end of said aircraft to deflect said gaseous jet to thereby define a primary control for controlling the direction of flight of said aircraft;

selectively controlling trim apparatus mounted forwardly of said aft end to trim the flight of said aircraft independently of said primary control, said vertical tail surface and said ailerons on said wing; and producing a difference in the time it takes for the movable nozzle to cause a maximum deflection of said gaseous jet and the time it takes the trim apparatus to reach full trim effectiveness, the time for said trim apparatus to reach full trim effectiveness being greater than the time for the primary control to cause a maximum deflection of the gaseous jet so that said primary control will be able to return quickly to a position providing maximum thrust for said aircraft after said aircraft has been trimmed.

2. An apparatus for maintaining a stabilized flight of an aircraft, comprising:

propulsion means for propelling a gaseous jet rearwardly of said aircraft from a nozzle rearwardly mounted on said aircraft to discharge said gaseous jet along a flow-axis for propulsion of said aircraft;

a wing having ailerons for aerodynamic support and a controllable vertical tail surface, said aircraft being free of a horizontal tail surface;

a movable nozzle rotatably secured to said aircraft aft of said first mentioned nozzle and being selectively operative for deflecting said gaseous jet between a first position wherein said flow axis of said jet is directed along and substantially parallel to the longitudinal axis of the aircraft and a second position wherein said flow-axis of said jet is directed at an angle to said longitudinal axis of said aircraft to thereby define a primary control for controlling the direction of flight of said aircraft and to artificially stabilize said aircraft;

attitude control means mounted forwardly of the aft end of said aircraft for trimming the flight of said aircraft by controlling the attitude of said aircraft independent of the aircraft controls offered by said movable nozzle, said vertical tail surface and said ailerons on said wing by generating a movement about the center of gravity of said aircraft, said attitude control means comprising means for supporting said wing for movement forward and rearward of said aircraft to thereby effect an altering of the lift generated by said wing relative to said center of gravity of said aircraft; and aerodynamic control circuitry for interrelating the movements of said movable nozzle and said attitude control means to thereby achieve an artificial stability in said aircraft.

3. An apparatus according to claim 2, wherein said supporting means for said wing comprises track means mounted on the fuselage of said aircraft and extending along and substantially parallel to said longitudinal axis of said aircraft.

4. An apparatus according to claim 2, wherein said wing is moved along said track means by hydraulic servomotors.

5. An apparatus for maintaining a stabilized flight of an aircraft, comprising:

propulsion means for propelling a gaseous jet rearwardly of said aircraft from a nozzle rearwardly mounted on said aircraft to discharge said gaseous jet along a flow-axis for propulsion of said aircraft;

a wing having ailerons for aerodynamic support and a controllable vertical tail surface, said aircraft being free of a horizontal tail surface;

a movable nozzle rotatably secured to said aircraft aft of said first mentioned nozzle and being selectively operative for deflecting said gaseous jet between a first position wherein said flow-axis of said jet is directed along and substantially parallel to the longitudinal axis of the aircraft and a second position wherein said flow-axis of said jet is directed at an angle to said longitudinal axis of said aircraft to thereby define a primary control for controlling the direction of flight of said aircraft and to artificially stabilize said aircraft;

attitude control means mounted forwardly of the aft end of said aircraft for trimming the flight of said aircraft by controlling the attitude of said aircraft independent of the aircraft controls offered by said movable nozzle, said vertical tail surface and said ailerons on said wing by generating a movement about the center of gravity of said aircraft; and aerodynamic control circuitry for interrelating the movements of said movable nozzle and said attitude control means to thereby achieve an artificial stability in said aircraft, said aerodynamic control circuitry includes (1) means for adjusting the position of said movable nozzle in response to a difference existing between desired attitude for said aircraft and said actual value of said attitude, (2) means for adjusting the position of said attitude control means in response to a difference existing between desired attitude for said aircraft and said actual value of said attitude and (3) time delay means for generating a difference in the time it takes for said movable nozzle to cause a maximum deflection of said gaseous jet and the time it takes said attitude control means to reach full trim effectiveness, said time for said attitude control means to reach full trim effectiveness being greater than said time for said movable nozzle to cause a maximum deflection of said gaseous jet.

* * * * *